(12) United States Patent
Yoshida et al.

(10) Patent No.: US 7,443,921 B2
(45) Date of Patent: Oct. 28, 2008

(54) MOBILE BODY COMMUNICATION APPARATUS

(75) Inventors: Yutaka Yoshida, Osaka (JP); Takashi Maehata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 183 days.

(21) Appl. No.: 10/497,725

(22) PCT Filed: Nov. 11, 2002

(86) PCT No.: PCT/JP02/11749

§ 371 (c)(1),
(2), (4) Date: Dec. 22, 2004

(87) PCT Pub. No.: WO03/049474

PCT Pub. Date: Jun. 12, 2003

(65) Prior Publication Data

US 2005/0100112 A1    May 12, 2005

(30) Foreign Application Priority Data

Dec. 4, 2001    (JP)    ............... 2001-370279

(51) Int. Cl.
*H04L 27/18* (2006.01)
(52) U.S. Cl. .................. 375/279; 375/260; 375/280; 375/308; 370/215

(58) Field of Classification Search ................ 370/206, 370/208, 215; 375/347, 267, 279, 260, 295, 375/280, 308; 340/7.26; 455/503
See application file for complete search history.

(56) References Cited

U.S. PATENT DOCUMENTS

| 5,031,230 | A  | * | 7/1991  | Sandahl et al. | 455/501 |
|-----------|----|----|---------|----------------|---------|
| 6,456,669 | B1 | * | 9/2002  | Sakoda         | 375/283 |
| 2001/0002905 | A1 | * | 6/2001  | Funamori    | 370/342 |
| 2001/0031639 | A1 | * | 10/2001 | Makipaa     | 455/450 |
| 2001/0033547 | A1 | * | 10/2001 | Izumi       | 370/203 |
| 2006/0028977 | A1 | * | 2/2006  | Izumi       | 370/203 |

FOREIGN PATENT DOCUMENTS

| JP | 10-190612 A | 7/1998 |
|----|-------------|--------|
| JP | 11-136180 A | 5/1999 |
| JP | 2000134667  | * 5/2000 |

* cited by examiner

*Primary Examiner*—Mohammad Ghayour
*Assistant Examiner*—Leila Malek
(74) *Attorney, Agent, or Firm*—McDermott Will & Emery LLP (57) ABSTRACT

When communications of the same data are performed using a multi-carrier modulation method between a plurality of base stations and a mobile station at the same time and with the same frequency, a standing wave interference is generated to lower the carrier electric field level and the bit error rate is increased if the mobile station is located in an area where the reception powers of the electric waves from the base stations are almost identical. In order to prevent this, phase differences are set between the sub-carriers at the base station so as to enable the mobile station to avoid a situation in which all the sub-carriers are mutually cancelled. Thus, it is possible to easily correct an error, thereby improving the quality of communication.

3 Claims, 10 Drawing Sheets

MOBILE BODY COMMUNICATION APPARATUS

TECHNICAL FIELD

The present invention relates to a mobile communication system between a mobile station and plural base stations communicating the same data at the same frequency at the same time using a multi-carrier modulation method.

BACKGROUND ART

In a mobile communication system, communication between a mobile station and plural base stations is carried out in communication areas (cells) formed by each base station. In a predetermined area, plural base stations are formed such that plural cells are partly overlapped. The same data are transmitted from each of the plural base stations at the same frequency at the same time.

By adopting such a system configuration in the mobile communication system, a wide communication area can be formed by connecting cells in a chain-like manner, and a burden to the mobile station can be minimized.

However, if the mobile station communicates with the base station at an overlapped site, that is, a place where the intensity of electric power of reception signals of a radio wave transmitted from each of the base stations is approximately equal, an interference of standing waves is generated and an electrical field level of carriers is lowered, and resultantly a Bit Error Rate (BER) is increased.

Multi-carrier modulation methods such as an Orthogonal Frequency Division Multiplex (OFDM) method have been studied for use in mobile communication systems. Even by these methods, it is difficult to prevent the deterioration of the communication quality, because all sub-carriers are affected by the interference of standing waves.

DISCLOSURE OF INVENTION

The inventors propose a mobile communication apparatus that enables communication with a certain level of quality at any point in a cell, particularly where communications from two base stations interfere with each other. This is done by performing positive phase adjustment of each sub-carrier, which is modulated using a multi-carrier modulation method, at the base station so that the deterioration of communication quality can be prevented.

Thus, the present invention particularly relates to a mobile communication apparatus that is capable for achieving a high quality communication level at a place where interference of communications in two cells tends to occur.

The first feature of the mobile communication apparatus of the present invention is that the mobile communication apparatus in a base station comprises a phase adjustment means to set phase differences to sub-carriers at a transmission time.

The second feature of the mobile communication apparatus of the present invention relates to a method of setting the phase differences to the sub-carriers. Phase differences in the range of $0$-$2\pi$ may be set at approximately equal intervals to the plural sub-carriers, or may be set randomly.

The third feature of the mobile communication apparatus of the present invention is that the mobile communication apparatus at a base station is capable of setting phase differences to the sub-carriers in a manner such that a phase shift according to the difference of a propagation distance of each sub-carrier at a reception point is taken into consideration.

BEST MODE FOR CARRYING OUT THE INVENTION

Base stations are expressed by A and B, and plural sub-carriers are expressed by $f_1, f_2, \ldots$ A sub-carrier is expressed representatively by $f_i$ ($i=1, 2, 3, \ldots$).

Assuming that a sub-carrier $f_i$ transmitted from a base station A and a sub-carrier $f_i$ transmitted from a base station B are synchronized (both frequencies are completely the same, and the phase differences do not change with elapse of time), the composite sub-carrier $f_i$ is attenuated at a point where a phase difference $\Delta_i$ between the sub-carrier $f_i$ transmitted from the base station A and the sub-carrier $f_i$ transmitted from the base station B becomes $\pi$ in the area where electric power of reception signals becomes approximately equal in a communication area, in the case where these sub-carriers are not provided with phase differences, that is, the phase differences between the sub-carriers $f_i$ transmitted from the base stations A and B are the same for each sub-carrier i.

However, as in the present invention, if a phase difference is set to the plural sub-carriers when transmitted, the phase difference $\Delta_i$ between the sub-carrier $f_i$ transmitted from the base station A and the sub-carrier $f_i$ transmitted from the base station B becomes different for each i.

This means that, at a point where the phase difference $\Delta_i$ of a sub-carrier $f_i$ is $\pi$, a phase difference $\Delta_j$ of another sub-carrier $f_j$ (i≠j) does not become $\pi$. Therefore, even if a sub-carrier is attenuated at a point in the communication area, the other sub-carriers are not attenuated, and resultantly communications are secured.

Phase differences in the range of $0-2\pi$ may be set to plural sub-carriers randomly or at approximately equal intervals.

In the above discussion, the point where electric power of reception signals becomes approximately equal in a communication area is assumed to be a point where the distances from the base station A and B are equal. However, if each of the antennas of the base stations has its own directivity etc., a point where intensities of electric power of reception signals in a communication area are approximately equal is not necessarily the point where the distances from the base stations A and B are equal. In this case, it is desirable that phase differences be set to sub-carriers of the base stations, considering a phase shift which may occur to them at a reception point because of a difference in the propagation distance.

If the distances from the base stations A and B to the point where the electric power of reception signals in a communication area are approximately equal are represented by $d_1$ and $d_2$, respectively, a phase based on the distance $d_1$ is $-2\pi d_1/\lambda_i$ and a phase based on the distance $d_2$ is $-2\pi d_2/\lambda_i$ for the sub-carriers transmitted from the base station A, wherein $\lambda_i$ is a propagation wavelength of a sub-carrier $f_i$.

Thus, it is desirable that the phase difference $2\pi(d_2-d_1)/\lambda_i$, which is based on a difference in the propagation distances, be added beforehand to the phase difference of sub-carriers $f_i$ transmitted from the base stations A and B. Specifically, (1) $2\pi(d_2-d_1)/\lambda_i$ may be added to the phase of a sub-carrier $f_i$ transmitted from the base station A, (2) $2\pi(d_2-d_1)/\lambda_i$ may be added to the phase of a sub-carrier $f_i$ transmitted from the base station B, or (3) $2\pi d_1/\lambda_i$ may be added to the phase of a sub-carrier $f_i$ transmitted from the base station A and $2\pi d_2/\lambda_i$ may be added to the phase of a sub-carrier $f_i$ transmitted from the base station B.

Thus, the phase difference based on the propagation distance to the point where electric power of reception signals in a communication area is approximately equal can be compensated beforehand.

Preferred embodiments of the present invention will be described hereinafter in detail referring to the attached figures.

Figure 1:
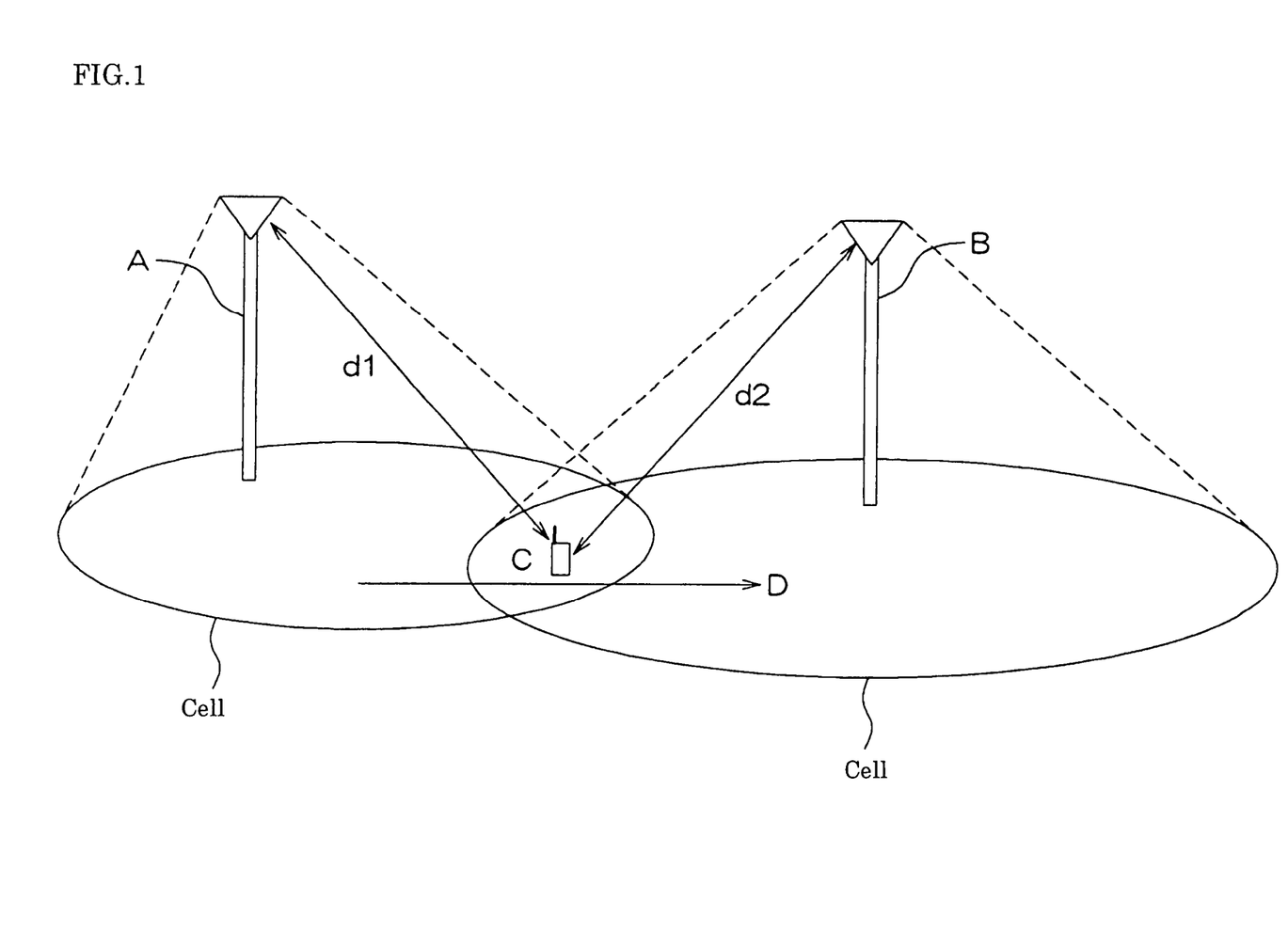
FIG. 1 illustrates a system configuration of a mobile communication system.

FIG. 1 illustrates a system configuration of a mobile communication system, in which cells are formed by the base stations A and B. It is assumed that the cells are partly overlapped and a mobile station C is located in the overlapped area. The mobile station C is, for example, a car navigation apparatus, a mobile phone, a mobile personal digital assistant (PDA) terminal, a personal computer, or the like. A carrier modulation method is assumed to be an ODFM modulation method. However, the present invention is not limited to this example, other multi-carrier modulation methods can be used. The distance between the base station A and the mobile station C is assumed to be d1, and the distance between the base station B and the mobile station C is assumed to be d2.

Figure 2:
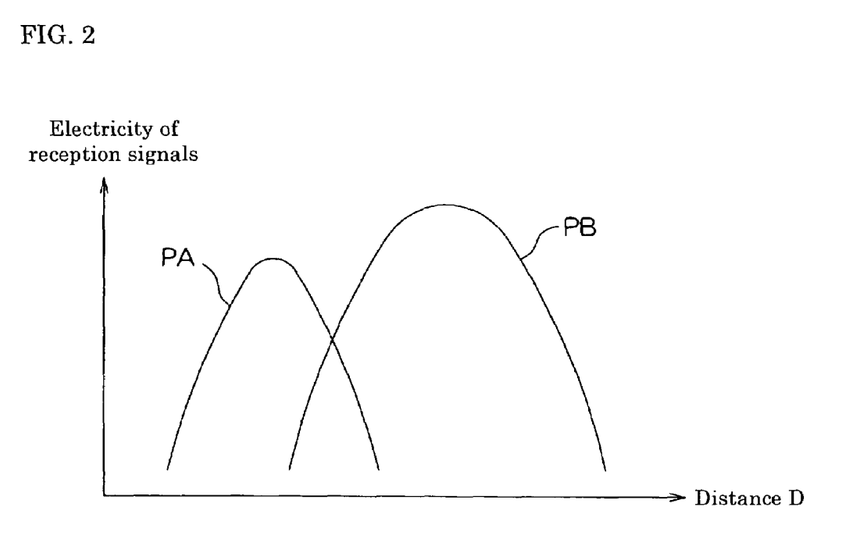
FIG. 2 is a graph showing changes in the intensity of electric power of reception signals along position D moving from Cell A to Cell B.

FIG. 2 is a graph showing changes in the intensity of electric power of reception signals along position D from a Cell A to a Cell B (interference between carriers is not considered in this graph). The electric power of reception signals of a radio wave transmitted from the base station A is indicated by PA, and the electric power of reception signals of a radio wave transmitted from the base station B is indicated by PB. The electric power of reception signals decreases markedly at the point where the phase difference of sub-carriers becomes $\pi$ in the area where both electric power are approximately equal by means of mutual weakening electrical fields. At the point where intensities of electric power of reception signals are different, signals from one of the base stations becomes superior and the electric power of reception signals does not decrease markedly even when the phase difference of sub-carriers becomes $\pi$.

Figure 3:
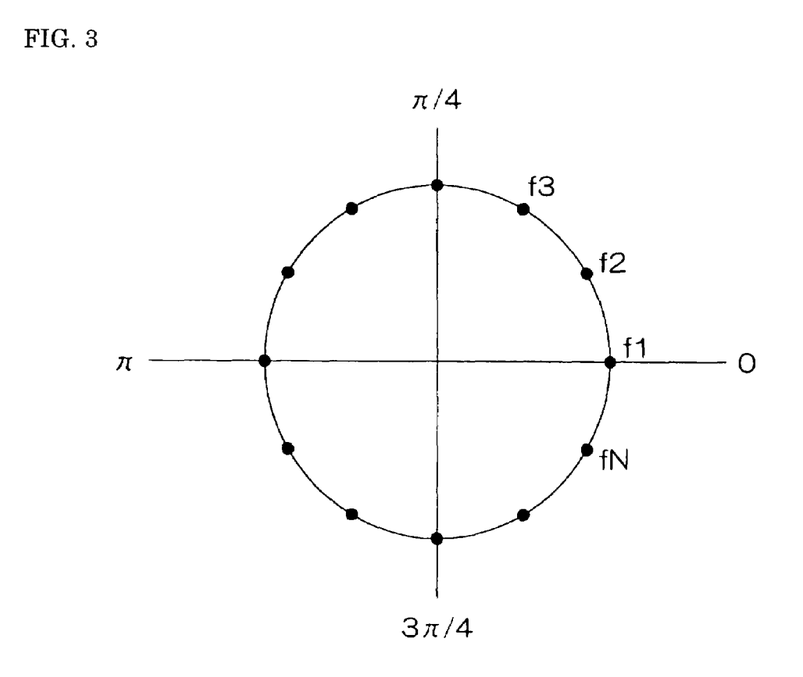
FIG. 3 is a graph showing a phase arrangement of sub-carriers respect to an example of the present invention.

FIG. 3 illustrates a graph of phase arrangements of sub-carriers related to an example of the present invention. The number of sub-carriers is N, and each of the sub-carriers is referred to as $f_1, f_2, \ldots, f_N$. It is assumed that frequency becomes high as the subscript increases. In this example, a phase of the sub-carrier $f_1$ is assumed to be 0, and phases of the other sub-carriers following $f_1$ are arranged at equal intervals.

Figure 4:
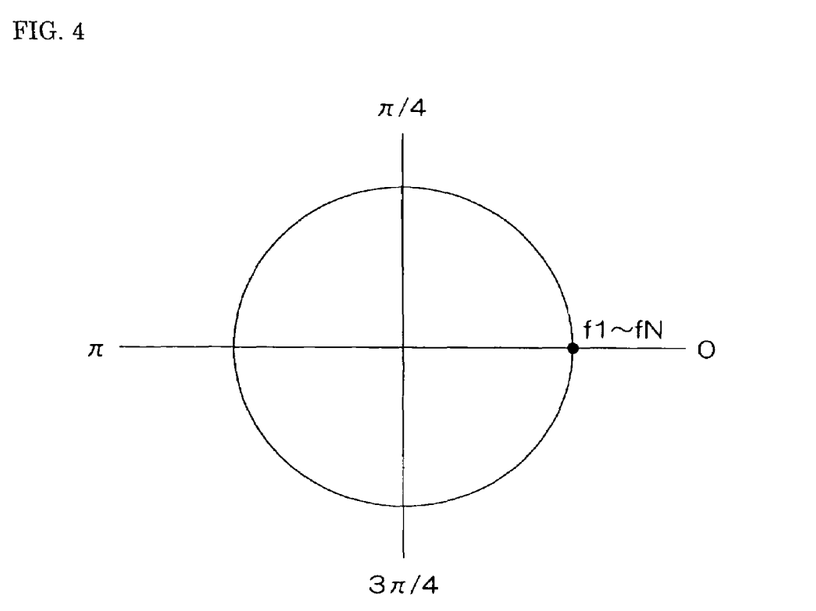
FIG. 4 is a graph of a phase arrangement in a case where all phases of sub-carriers are the same.

FIG. 4 illustrates a graph of phase arrangements in the case that all phases of the sub-carriers are the same (0).

Figure 5:
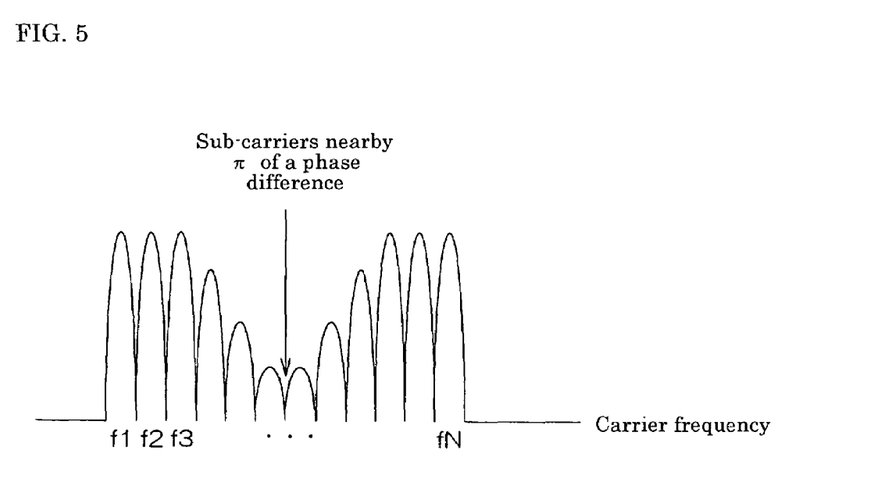
FIG. 5 is a graph showing the distribution of electric power of sub-carriers after the sub-carriers having phase arrangements as shown in FIGS. 3 and 4 have been added together.

If two sub-carriers having the same electric power in the reception signals, one of the sub-carriers having phase arrangements shown in FIG. 3 and the other having the phase arrangement shown in FIG. 4, are added together, the distribution of electric power of the sub-carriers after they are added together is as shown in FIG. 5. Sub-carriers having their phase differences nearby 0 or $2\pi$ are mutually strengthened, but sub-carriers having their phase difference nearby $\pi$ are mutually weakened, resulting in a decrease in their electric power. Assuming that the mobile station C is located near a point where reception signals of a radio wave from the base stations have equal electric power, the phase difference based on the difference in the propagation distances, $2\pi(d_1-d_2)/\lambda_i$, is included beforehand in the phase difference of sub-carriers of reception signals at the mobile station C. A sub-carrier number is represented by i, the number of sub-carriers is represented by N and a wavelength of an i-th sub-carrier is represented by $\lambda_i$. The phase difference, $2\pi(d_1-d_2)/\lambda_i$, based on the difference in the propagation distances is added to the sub-carriers transmitted from the base stations A and B so as to compensate the phase difference based on the difference in the propagation distances. Under such conditions, sub-carriers to which the phase arrangement $2\pi i/N$ shown in FIG. 3 has been added are transmitted from a base station, and a sub-carrier to which the phase arrangement shown in FIG. 4 has been added are transmitted from the other base station.

For example, a sub-carrier having a phase of $2\pi i/N - 2\pi d_1/\lambda_i$ is transmitted from the base station A, and a sub-carrier having a phase of $-2\pi d_2/\lambda_i$ is transmitted from the base station B. The electric power of reception signals at the mobile station C is decreased because of mutual weakening by the electrical fields with respect to the sub-carrier having their phase difference nearby $\pi$, but the electric power is increased because of their mutual strengthening with respect to the sub-carrier having their phase difference nearby 0 or $2\pi$. Therefore, the situation in which the electric power of all sub-carriers decreases can be avoided.

FIGS. 6(A) and 6(B) are graphs in which sub-carriers are plotted on the abscissa and a time t is plotted on the ordinate.

Sub-carriers that cannot be corrected in a receiver of the mobile station because of decrease in the electric power to a level below a threshold value are expressed by hatching in these graphs. FIG. 6(A) illustrates the case in which a mobile station does not move, and FIG. 6(B) illustrates the case in which a mobile station moves along distance D in a cell. Sub-carriers whose electric power has decreased below the threshold value vary gradually as shown in FIG. 6(B). The distribution of electric power in the reception signals of sub-carriers at the two time points $t_1$ and $t_2$ shown in FIG. 6(B) are illustrated in FIG. 7. In this case, the phase differences based on the distance are taken into consideration for the sub-carriers transmitted from base stations. However, if it is unnecessary to consider the phase difference, the phase arrangement need not be added to the phases of sub-carriers.

Figure 8:
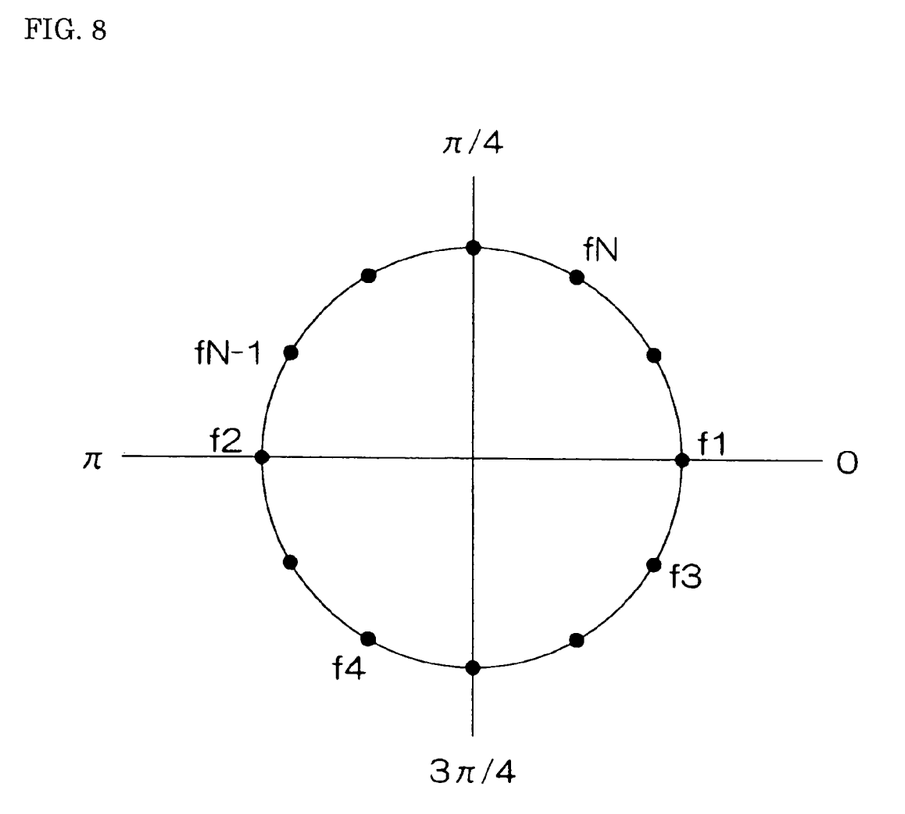
FIG. 8 is a graph of a random phase arrangement of sub-carriers with respect to another example of the present invention.

FIG. 8 illustrates a graph of phase arrangements of sub-carriers related to another example of the present invention. It is assumed that a phase of each sub-carrier $f_1, f_2 \ldots f_N$ is arranged randomly.

Figure 9:
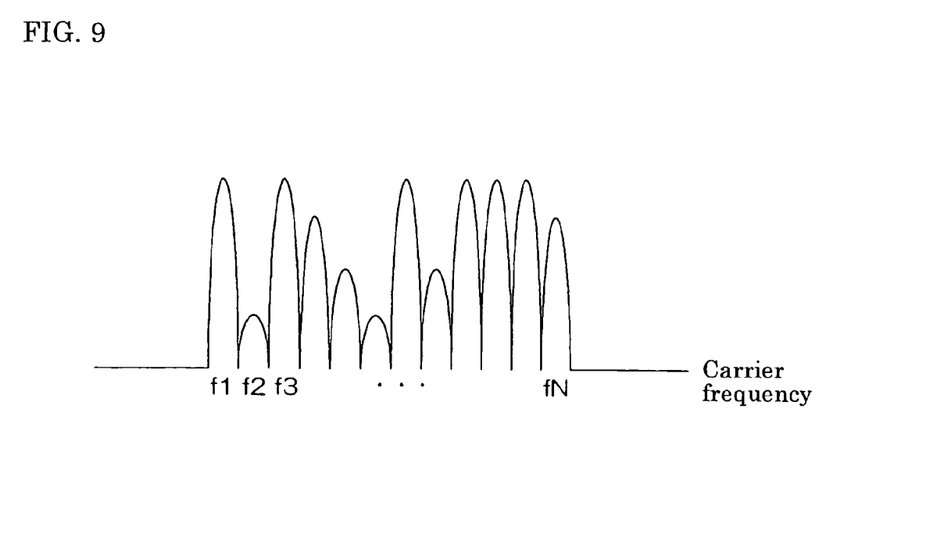
FIG. 9 is a graph showing the distribution of electric power of sub-carriers in which the sub-carriers having phase arrangements as shown in FIGS. 4 and 8 are added together.

When sub-carriers having the phase arrangements shown in FIG. 8 and sub-carriers having the phase arrangement shown in FIG. 4 are added together, the distribution of electric power of the sub-carriers after being added becomes as shown in FIG. 9. Sub-carriers whose phase differences are nearby 0 or $2\pi$ are strengthened, and sub-carriers whose phase differences are nearby $\pi$ are weakened. However, there is no regularity regarding their arrangement.

FIGS. 10(A) and 10(B) are graphs in which sub-carriers are plotted on the abscissa and a time t is plotted on the ordinate. Sub-carriers that cannot be corrected in a receiver of the mobile station because of decrease in the electric power to a level below a threshold value are expressed by hatching in these graphs. FIG. 10(A) illustrates the case in which a mobile station does not move, and FIG. 10(B) illustrates the case in which a mobile station moves. Sub-carriers whose electric power is decreased below the threshold value vary randomly as shown in FIG. 10(B). This is because the phase of each sub-carrier, $f_1, f_2, \ldots, f_N$, is arranged randomly as shown in FIG. 8. (On the other hand, in FIG. 6(B), sub-carriers whose electric power is decreased below the threshold value are shifted in turn, since the phase of each sub-carrier, $f_1, f_2, \ldots f_N$, varies according to the carrier number as shown in FIG. 3.)

The effect of changing the phase arrangement of a sub-carrier to be transmitted from a base station as described above is explained as follows.

Figure 11:
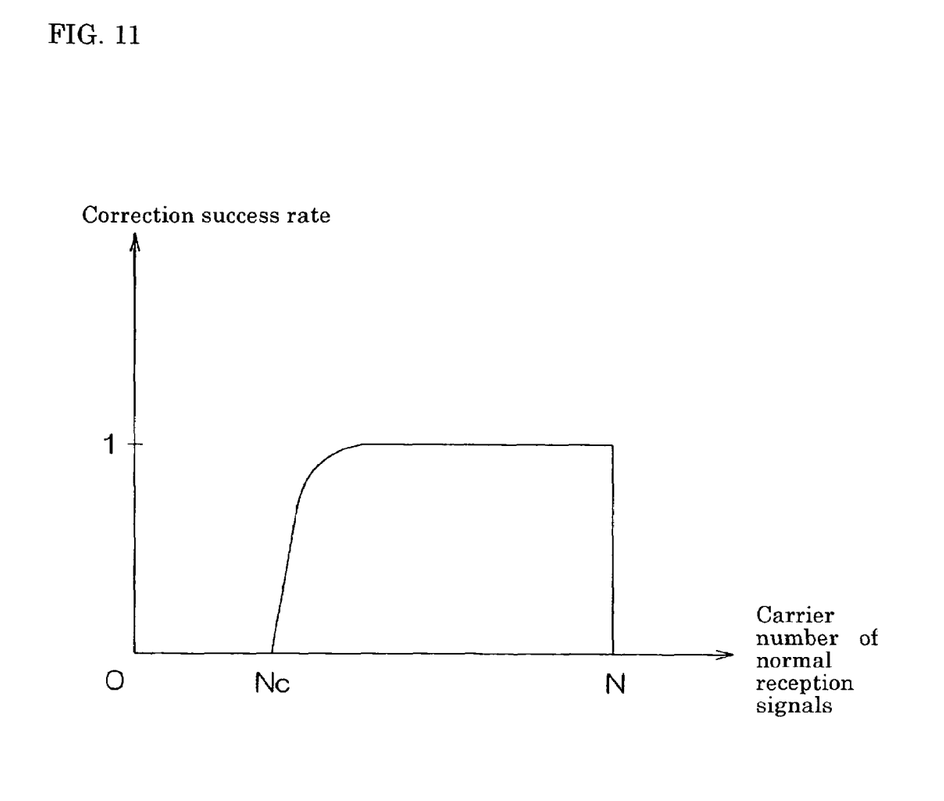
FIG. 11 is a graph showing general relationships between the number of carriers having normal reception signals and the success rate of correction using an error-correction code.

FIG. 11 generally shows a relationship between the number of carriers having normal reception signals and a success rate of correction using an error-correcting code in a multi-carrier modulation method such as OFDM. According to FIG. 11, if the number of carriers having normal reception signals is more than a certain number, $N_c$, an error can be successfully corrected, but if the number of carriers having normal reception signals is less than $N_c$, it is difficult to correct an error.

Figure 6:
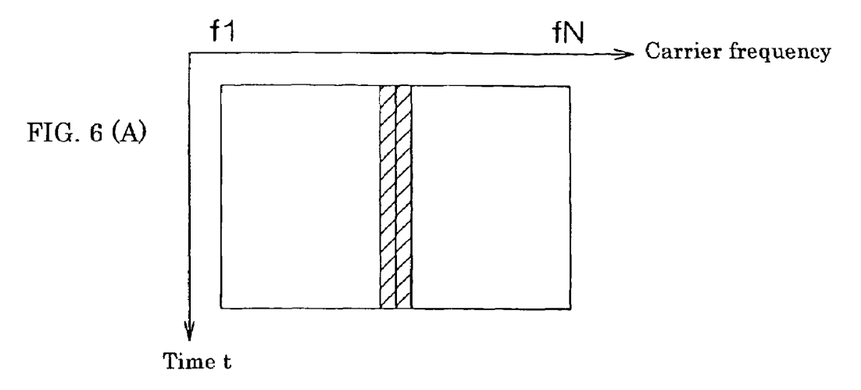
FIG. 6(A) is a graph of reception signals in a case where a mobile station does not move. Sub-carrier frequency is plotted on the abscissa, and time t is plotted on the ordinate.
FIG. 6(B) is a graph of reception signals in a case where a mobile station moves in a cell. Sub-carrier frequency is plotted on the abscissa, and time t is plotted on the ordinate as in FIG. 6(A).
Figure 7:
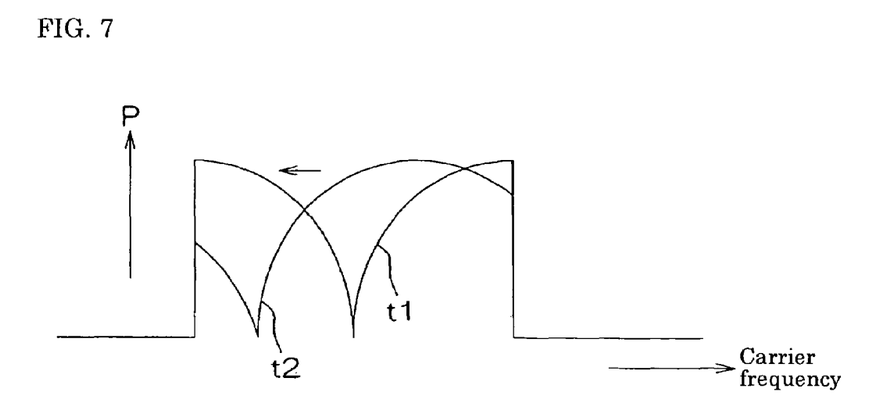
FIG. 7 is a graph of electric field distribution of reception signals of sub-carriers at two time points $t_1$ and $t_2$ as shown in FIG. 6(B).
Figure 10:
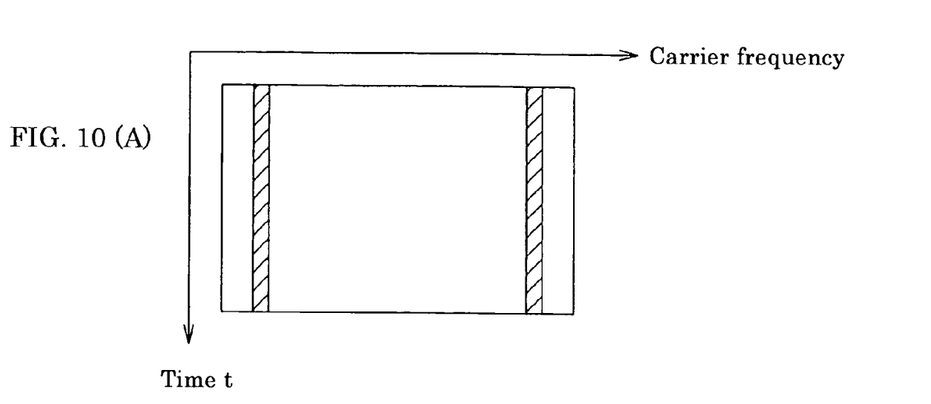
FIG. 10(A) is a graph of reception signals in a case where a mobile station does not move. Sub-carrier frequency is plotted on the abscissa, and time t is plotted on the ordinate.
FIG. 10(B) is a graph of reception signals in a case where a mobile station moves in a cell. Sub-carrier frequency is plotted on the abscissa, and time t is plotted on the ordinate as in FIG. 10(A).

In the present invention, the number of sub-carriers whose electric power is decreased below the threshold value is limited at any time domain as shown in FIG. 6 or 10. Therefore, if the number of the sub-carriers whose electric power is decreased below the threshold value is less than Nc, a correction success rate always can be maintained at about 1.

Examples of circuits of a transmitter and a receiver which compose a mobile communication apparatus of the present invention are explained as follows. The circuit configuration of a transmitter and a receiver is common to both of a base station and a mobile station.

Figure 12:
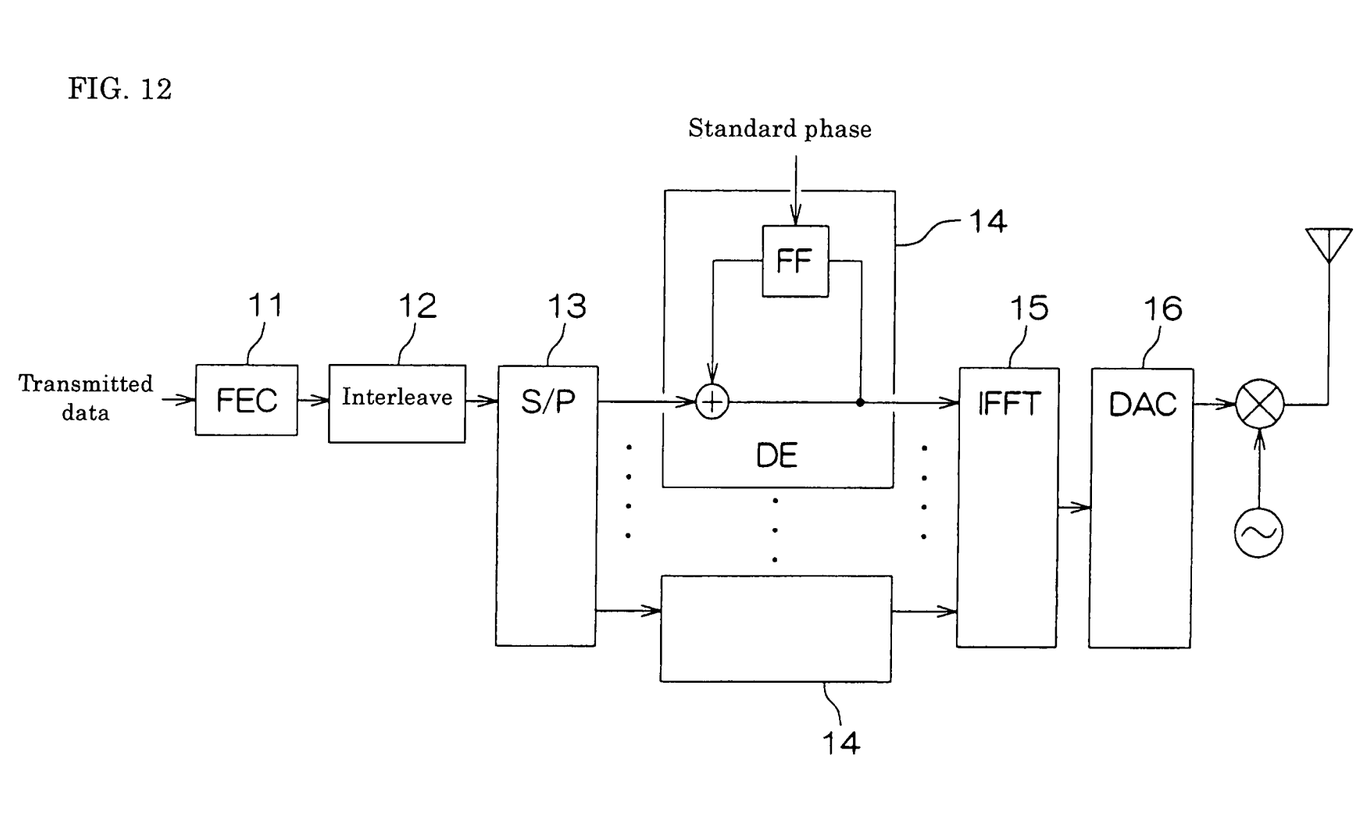
FIG. 12 illustrates a block diagram of a circuit configuration of a transmitter for use in a mobile communication apparatus of the present invention.

FIG. 12 is a block diagram illustrating a circuit configuration of a transmitter. Transmitted data are encoded using a Reed-Solomon code in an error-correction code coding circuit 11. These encoded data are rearranged (interleaved) in an interleave circuit 12 for achieving an effective performance of error-correction code. And these rearranged data are converted from serial signals to parallel signals in an S/P conversion circuit 13. Converted parallel signals are differentially coded using a flip-flop FF in a differential coding circuit 14 functioning as a phase adjustment means. At this time, a standard phase is set to each sub-carrier with a phase difference being afforded. The method of setting such phase difference is as explained in the above description referring to FIGS. 3 and 8. Differentially coded signals are subjected to an inverse-Fourier transform in an inverse-Fourier transforming circuit 15, and are modulated using a Differential Quadrature Phase Shift Keying (DQPSK) modulation scheme in an analog conversion circuit 16. The frequencies of the modulated signals are converted, and are supplied to a transmission antenna.

Figure 13:
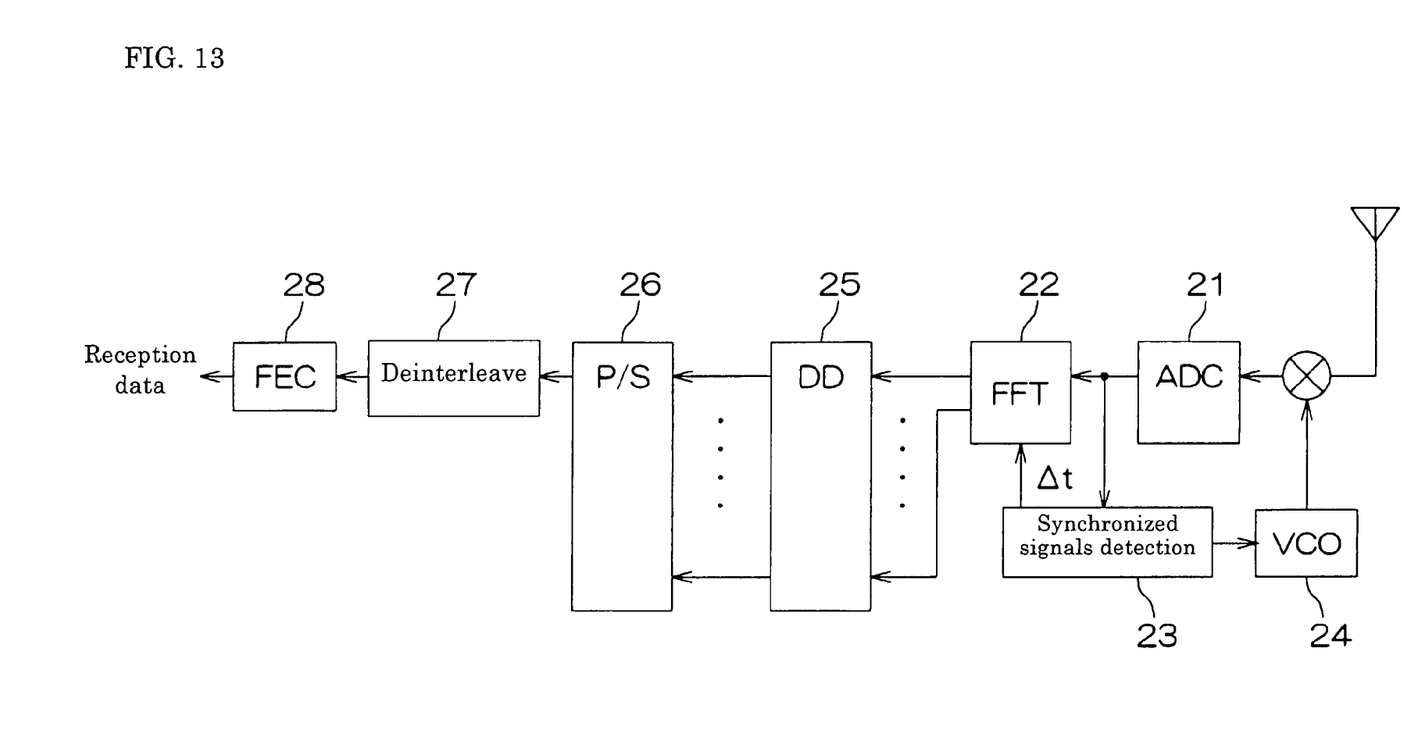
FIG. 13 illustrates a block diagram of a circuit configuration of a receiver for use in a mobile communication apparatus of the present invention.

FIG. 13 is a block diagram illustrating a circuit configuration of a receiver. The frequencies of the high frequency signals received by an antenna are converted, and their analogue signals are converted to digital signals in a digital conversion circuit 21. The digital signals are subjected to Fourier transform in a Fourier transform circuit 22. Numeral 23 expresses a synchronized signal detection circuit, and numeral 24 expresses a voltage control oscillator. Signals that have been subjected to Fourier transform by the Fourier transform circuit 22 are differentially decoded in a differential decoding circuit 25, and the parallel signals are converted to serial signals in a P/S conversion circuit 26. The serial signals are rearranged in a deinterleave circuit 27, and an error-correction is carried out in an error-correction circuit 28. The corrected signals are output as reception data.

Figure 14:
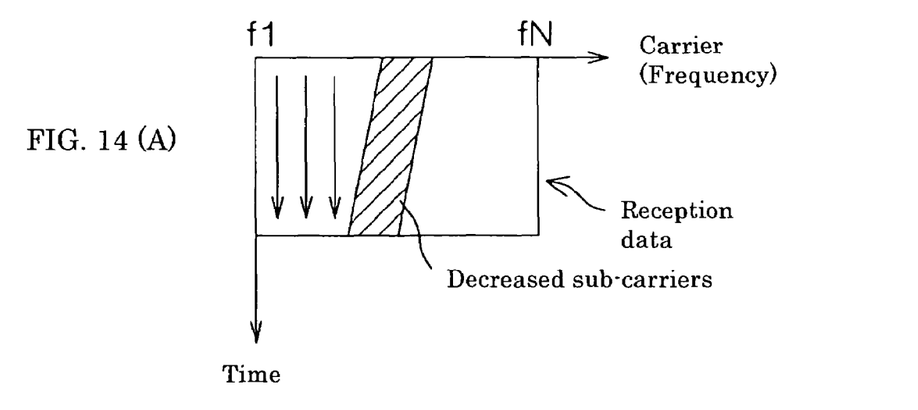
FIG. 14(A) is a figure for explaining the function of deinterleave, showing reception data arranged on the frequency axis and time axis.
FIG. 14(B) is a figure for explaining the function of deinterleave, showing reception data written in a row direction and rearranged to the code row having a code length L.

The function of the deinterleave circuit 27 is explained referring to FIG. 14. FIG. 14(A) illustrates reception data arranged on time axis and frequency axis. The reception data are read sequentially on the time axis as shown in FIG. 14(A), and are rearranged such that the read data are written on a row direction in a code having a length L, as shown in FIG. 14(B).

The case in which phases of sub-carriers are arranged at equal intervals as shown in FIG. 3, and in which a mobile station moves along position D from Cell A to Cell B is assumed.

In the reception data in FIG. 14(A), bytes that may generate an error because of decrease in the electric power of sub-carriers to a level below a threshold value are described by hatching. In the reception data that have been subjected to deinterleave, the bytes that may cause an error progress zig-zag in a row direction as shown in FIG. 14(B). When the codes are read out in the line axis in FIG. 14(B), the number of bytes that may generate an error becomes a fixed number S in a row of a code length L. Therefore, if an error-correction code that can correct an error having up to S bytes among the codes having a code length L is used, the error can consistently be corrected.

On the other hand, in the case where the number of bytes that may cause an error differs depending on a line, an error cannot always be corrected, even if the total number of bytes that may cause an error is the same.

The embodiments of the present invention are not limited to the above description, and the examples shown in the description are changeable within the scope of the present invention.

INDUSTRIAL APPLICABILITY

According to the present invention, since the standard phase of plural sub-carriers can be set arbitrarily in the range of 0-2π when signals are transmitted simultaneously from antennas of plural base stations using a multi-carrier modulation method, many sub-carriers that mutually strengthen their electric power always exist while there are a few sub-carriers that mutually weaken their electric power.

Therefore, the present invention enables avoiding a situation in which all sub-carriers are mutually weakened, and thereby enables an error to be corrected by an error-correction means. Accordingly, the present invention is useful for improving the quality of communications.

The invention claimed is:

1. A mobile communication apparatus in a mobile communication system having plural base stations in which communication of the same data is performed using a multi-carrier modulation method between the base stations and a mobile station at the same frequency and at the same time, the mobile communication apparatus having a phase adjustment means that can set a phase difference to sub-carriers at the plural base stations at a transmission time, the phase difference varying from one sub-carrier to another, wherein a point where the intensity of electric power of reception signals from the plural base stations is approximately equal is specified, and a compensation value, $2\pi(d_2-d_1)/\lambda_i$, of a propagation phase difference based on a difference of distance, $d_2-d_1$, is added beforehand to a phase difference between a sub-carrier $f_i$ transmitted from a base station A and a sub-carrier $f_i$ transmitted from a base station B, wherein i=1~N; N is the number of sub-carriers, $\lambda_i$ is a propagation wavelength of i-th sub-carrier, $d_1$ represents the distance between the base station A of said plural base stations and said specified point, and $d_2$ represents the distance between the base station B of said plural base stations and said specified point.

2. A mobile communication apparatus according to claim 1, wherein said phase adjustment means sets a phase of 0-2π at approximately equal intervals to the plural sub-carriers.

3. A mobile communication apparatus according to claim 1, wherein said phase adjustment means sets a phase of 0-2π randomly to the plural sub-carriers.

* * * * *